United States Patent [19]
Shaw et al.

[11] Patent Number: 5,526,678
[45] Date of Patent: Jun. 18, 1996

[54] TIME OF FLIGHT MEASUREMENT/RATE OF RISE MEASUREMENT METHOD FOR REMOTE LEAK DETECTION IN EVACUATED SPACES

[75] Inventors: Paul B. Shaw, Houston; Charles N. Sherlock, Spring; Rick W. Prior, Houston, all of Tex.

[73] Assignee: Chicago Bridge & Iron Technical Services Company, Oak Brook, Ill.

[21] Appl. No.: 288,076

[22] Filed: Aug. 10, 1994

[51] Int. Cl.$^6$ .......................... G01M 3/24; G01M 3/08; G01N 29/00
[52] U.S. Cl. ..................... 73/40; 73/40 A; 364/558
[58] Field of Search ..................... 73/40, 40.5 R, 73/40.5 A, 40, 40.50 R, 40.50 A

[56] References Cited

U.S. PATENT DOCUMENTS

| | | | |
|---|---|---|---|
| 3,581,195 | 5/1971 | Jepsen | 324/33 |
| 3,645,127 | 2/1972 | Mongodin et al. | 73/40.7 |
| 4,091,658 | 5/1978 | Covington et al. | 73/40.5 R |
| 4,459,844 | 7/1984 | Burkhart | 73/40.7 |
| 4,575,807 | 3/1986 | Dodge | 364/558 |
| 4,584,877 | 4/1986 | Brayman | 73/40.7 |
| 4,593,554 | 6/1986 | Aarts | 73/49.3 |
| 4,779,449 | 10/1988 | Bley et al. | 73/40.7 |
| 4,893,497 | 1/1990 | Danielson | 73/40.7 |
| 5,010,761 | 4/1991 | Cohen et al. | 73/40.7 |
| 5,038,614 | 8/1991 | Bseisu et al. | 73/592 |
| 5,049,168 | 9/1991 | Danielson | 55/17 |
| 5,052,215 | 10/1991 | Lewis | 73/40.5 A |
| 5,081,864 | 1/1992 | Zaim | 73/49.2 |
| 5,116,196 | 5/1992 | Baret et al. | 415/89 |
| 5,117,677 | 6/1992 | Hendershot et al. | 73/49.2 |
| 5,201,213 | 4/1993 | Henning | 73/49.2 |
| 5,258,050 | 11/1993 | Danielson | 55/17 |
| 5,278,074 | 1/1994 | Rao et al. | 436/52 |
| 5,319,956 | 6/1994 | Bogle et al. | 73/640.50 |
| 5,333,501 | 8/1994 | Okada et al. | 73/592 |
| 5,341,670 | 8/1994 | Brook et al. | 73/40.5 A |
| 5,343,740 | 9/1994 | Myneni | 73/40.7 |
| 5,365,772 | 11/1994 | Ueda et al. | 73/40.7 |
| 5,398,543 | 3/1995 | Fukushima et al. | 73/40.7 |
| 5,408,420 | 4/1995 | Slocum et al. | 364/558 |
| 5,416,323 | 5/1995 | Hoots et al. | 250/302 |
| 5,416,724 | 5/1995 | Savic | 364/509 |
| 5,428,989 | 7/1995 | Jerde et al. | 73/40.5 R |

*Primary Examiner*—Hezron E. Williams
*Assistant Examiner*—J. David Wiggins
*Attorney, Agent, or Firm*—Marshall, O'Toole, Gerstein, Murray & Borun

[57] ABSTRACT

Disclosed are apparatus and methods of remotely detecting leakage into an evacuated space to detect the location of the leak. A number of pressure gauges continually monitoring pressure, rise in pressure and the rate of that pressure rise of the space. The locations nearest a leak will detect the pressure rise earliest in time and will have the highest rate of pressure rise. The distance between any one location and the leak being directly proportional to the time required for the increase in pressure to be observed at the location and inversely proportional to the rate of rise.

15 Claims, 17 Drawing Sheets

TIME OF FLIGHT MEASUREMENT/RATE OF RISE MEASUREMENT METHOD FOR REMOTE LEAK DETECTION IN EVACUATED SPACES

This invention was made with Government support under Contract No. DNA001-92-C-0064 awarded by the Defense Nuclear Agency. The Government has certain rights in the invention.

This invention relates generally to leak detection systems and particularly to remote detection of leakage into an evacuated space by measuring time of flight and rate of pressure rise at a number of locations inside the evacuated space to determine the location of the leak as the pressure rise is observed to arrive at the sensor locations sequentially in time relative to the distance from the pressure sensor to the leak. Further, the rate at which the pressure rises at any given location is directly related to the distance to the leak location.

BACKGROUND OF THE INVENTION

Remote leak detection of evacuated spaces has been performed previously by monitoring pressure change in the evacuated space over a period of time and noting pressure differences in discreet isolated volumes as being near a leak. The pressure change monitoring techniques previously used are limited to systems that permitted isolation of discreet volumes.

As related to the present invention, the ability to locate a leak in an evacuated system depends, in varying degrees, on three basic factors: the initiation of pressure increase due to the leakage at a point in time; the conductance within the evacuated vessel; and the amount of pressure increase due to leakage.

The first factor, the initiation of pressure increase at a point in time due to leakage, applies to systems which experience change in the leakage rate into the system. Examples of such systems include vacuum systems that experience an increase in leakage rate caused by external forces or cycling fatigue, or vacuum insulated superfluid helium systems which can have a super leak that will only pass leakage when the helium cools below the lambda transformation temperature (below 2.2K at std. pressure). Other related systems include those in which an existing leak has a significant increase in leakage rate at a point in time. One example of a system involves a vessel within a vessel. The inner vessel can be tested for leak detection and leak location by evacuating both vessels, then venting the inner vessel with dry air or nitrogen. During this venting, any leaks in the inner vessel wall will result in a pressure rise in the space between the vessels.

Another example is a single wall vacuum system which may be monitored by applying a volatile liquid to the outside of the system. The volatile liquid will vaporize when drawn through the leak, and cause a rise in the pressure within the vacuum system. This rise in pressure will indicate the presence of leakage and the invention provides an economical means of locating the leak.

The second factor of leak detection for the present invention involves the conductance within the vacuum system under examination. The more uniform the conductance within a space, the easier leak location application becomes. Also, the lower the conductance within the system, the easier it becomes to perform leak location and the more precise the leak location capability.

The third factor is the amount of pressure increase in the vacuum system due to the leakage from a leak. The change in pressure that occurs when the leak comes into existence or increases in leakage rate must be significant enough to be measured by the pressure gauges. The total volume of the vacuum system, its conductance, system pumping speed (if any), pressure, leakage and outgassing rates will determine the minimum detectable leakage rate.

Helium mass spectrometer leak testing can be more sensitive than the present invention, but it requires a greater degree of human access when used for leak location, and it is more time consuming and expensive when used for leak location on large systems.

Pressure change measurement is remote and is as sensitive as the invention, but it is limited in application to systems that can be isolated in discreet volumes. Further, it is not capable of as precise a location function as the present invention.

SUMMARY OF THE INVENTION

The present invention offers particular advantages for the leak detection and location of many systems. It is a practical means for the remote leak location for certain structures, specifically for large vacuum insulated superfluid helium containing systems. The invention is sensitive, fully remote, rapid and relatively low labor in application.

Further the present invention provides for fully remote leak detection and location without requiring isolation of discreet volumes. The invention makes remote leak detection and location more economical for systems which can be isolated into discreet volumes, and makes remote leak location possible on large volume vacuum systems which cannot be isolated into discreet volumes.

In accordance with the present invention, an apparatus and method are provided to detect leakage and the location of the source of leakage into an evacuated space quickly and remotely. Thus, an apparatus in accordance with the present invention includes: an evacuated system; multiple pressure gauges in communication with the evacuated system where each pressure gauge is able to detect pressure rise and rate of pressure rise within the evacuated system adjacent to the pressure gauge location and is able to generate a signal corresponding to the pressure rise and rate of pressure rise to be analyzed for comparison with other pressure gauge signals so as to identify the timing and sequence of detection of the pressure rise signal and the rate of pressure rise at the pressure gauge locations. The analysis of pressure gauge signals for timing, sequence, and rate of pressure rise may be used to determine the location of a leak.

The apparatus includes vacuum pressure gauges of either the hot or cold cathode ionization type. The vacuum system may include an inner vessel defining an evacuated space and an outer vessel surrounding the inner vessel in a coaxial arrangement to define a space there between. The inner space may contain liquid helium, air, or other product. The evacuated space may also include some obstructions to control the conductance and improve the leak location capability.

In accordance with the present invention a method is provided for detecting the location of leaks into an evacuated space. This includes the steps of detecting pressure rise and rate of pressure rise at multiple locations within the evacuated space by means of recording signals corresponding to the detection of a pressure rise and rate of pressure, and analyzing the signals from two or more gauges to identify the location of the leak.

BRIEF DESCRIPTION OF THE DRAWINGS

FIG. 6 represents the application of the invention to a structure with an evacuated vessel within an evacuated vessel. The boundary between the two vessels is tested by means of the invention when the evacuated inner vessel is backfilled with air or other gas.

DETAILED DESCRIPTION OF THE DRAWINGS

Figure 1:
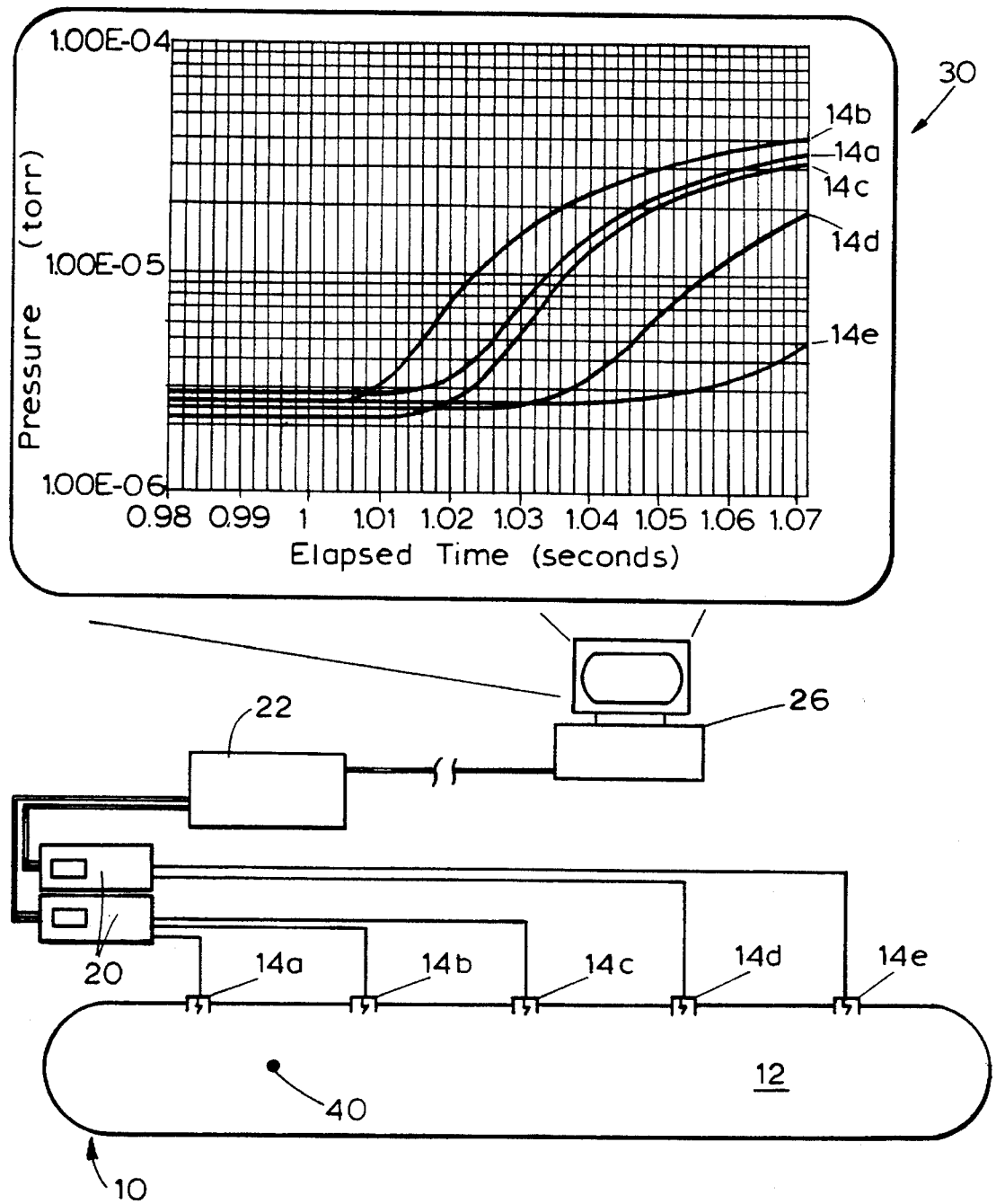
FIG. 1 is a schematic drawing of a device useful in practicing the present invention together with a representative signal output of the apparatus.

FIG. 1 illustrates a vessel 10 having an evacuated space 12 which is at substantially equilibrium pressure. Vessel 10 is merely representative of any evacuated space and particularly one used as an outer insulating vacuum vessel in conjunction with an inner vessel containing liquid helium (not illustrated). Evacuated space 12 can be any suitable shape and defined by any appropriate materials such as carbon steel, aluminum or stainless steel.

Vacuum gauges referred to collectively by reference character 14 are illustrated as being spaced along vessel 10 and being in communication with evacuated space 12. Individual pressure gauges are provided with a suffix "a" through "e" for ready identification. Vacuum gauges 14 may be positioned in the vacuum space 12 away from vessel 10 wall, adjacent to the vessel 10 wall or outside the vessel 10 and in communication with vapor space 12 through conduction tubes.

Vacuum gauges 14 are preferably cold cathode ionization gauges but may be hot cathode ionization gauges or other types of electronic vacuum gauges such as extractor gauges. The choice of which type of gauge to use in a particular system can be made by one of ordinary skill in vacuum technology based on the gauge response time to pressure change and the degree to which the gauges consistently respond to vapor space 12 conditions. The more rapid the gauge response and the greater the self-consistency of response, the greater the resolution of the apparatus. Similarly, the more uniform the gauge responsiveness for the same type and model, the greater the reliability and resolution of the system for leak location purposes. A suitable gauge is a cold cathode ionization pressure gauge manufactured by the HPS Division of MKS Instruments Inc. and bearing model no. 104210001.

Gauges 14 are electronically monitored by a gauge controller 20 such as the HPS Division series 937 controller.

A high speed data acquisition card 22 such as a DAS 1402 manufactured by Keithley Instruments, Inc. gathers data from the gauge controller 20. The data acquisition card 22 is typically installed in a microprocessor 26 loaded with typical laboratory data processing software such as Labtech Notebook 7.2 from Laboratory Technologies Corporation. Microprocessor 26, together with high speed data acquisition card 22 and software must be capable of gathering data at a high rate of speed. The polling rate of the unit described above is capable of polling rates as high as 100,000 samples per second.

The acquired data is processed and developed by microprocessor 26. Output 30 includes time versus absolute pressure data from each pressure gauge 14. The data in the output 30 of FIG. 1 indicates that a leak began at approximately one second elapsed monitoring time. Pressure gauge 14b was the first to sense the leak at about 1.01 seconds with pressure gauges 14a, 14c, 14d, and 14e following at their respective locations and the rate of pressure rise is indicated by the slope of each data line. A data line with a relatively steep slope indicates a high rate of rise. Thus, an operator monitoring output 30 from the gauges 14 would infer that a leak 40 had developed, that it was closest to gauge 14b, and very slightly closer to gauge 14a than gauge 14c.

Figure 2:
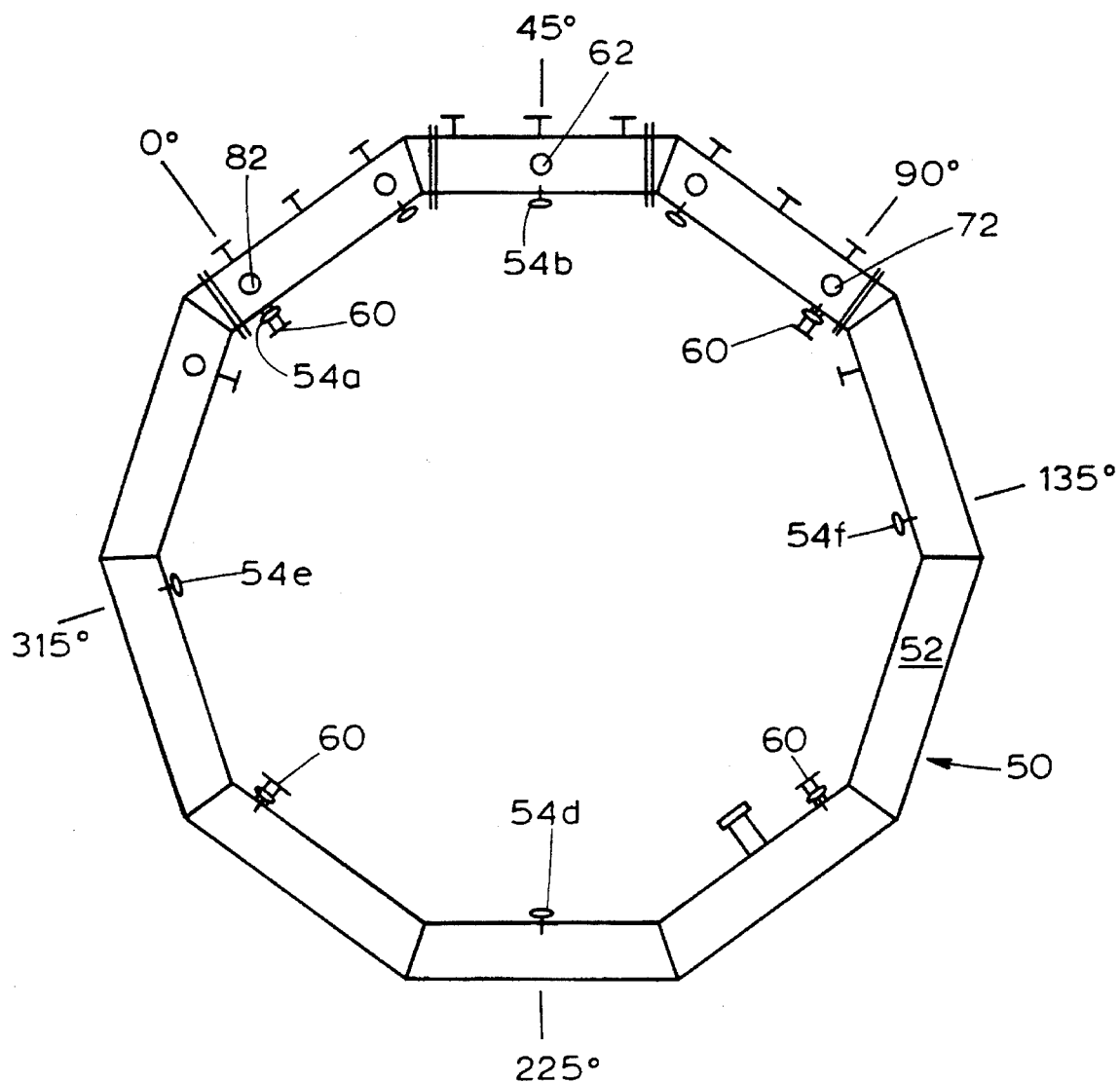
FIG. 2 is a plan view of vacuum vessel to which the invention has been applied.

FIG. 2 illustrates a decagon ring-shaped vacuum vessel 50 defining an evacuated space 52. The ring vessel 50 is constructed of ten mitered sections of pipe welded together at their ends. Relative positions in the vessel 50 are identified by degrees of rotation beginning with 0° in the upper left portion of the ring vessel 50, 45° top dead center, 90° at the upper right, 135° near the right middle, and 315° near the left middle, as illustrated. Ring vessel 50 as illustrated in FIG. 2 is unlined, has no significant internal obstructions, and will be referred to as "open."

Pressure gauges generally referred to collectively as 54 and specifically referred to with suffixes "a" through "f" are positioned around the ring vessel 50 as illustrated and are in communication with vapor space 52 to sense any pressure rise and rate of pressure rise in evacuated space 52 adjacent the gauge.

Also represented in FIG. 2 are four turbomolecular pumping stations referred to collectively by reference number 60 spaced at approximate equal distances from one another. Each pumping station 60 is capable of pumping nitrogen or helium in quantities greater than any leakage tolerances.

Pressure gauges 54 are monitored through a computer equipped with data acquisition software and a high speed data acquisition card as illustrated schematically in FIG. 1. To facilitate high speed sampling capability, the computer is connected to the buffered analog voltage output of the gauge controllers 20. A computer such as a Gateway 386 equipped with software such as Labtech Notebook 7.2 is capable of sampling to 100,000 samples per second and obtaining adequate data. It is possible in some applications to sample as few as 300 samples per second and obtain adequate data. The sampling rate is based, in part, upon the spacing of the pressure gauges 54. The closer the spacing the higher the sampling rate required.

Experiments were conducted on such a ring vessel 50 using three valves to simulate leaks of known sizes. The known leaks were a variable vernier air leak and a pinched capillary helium leak. The test ring vessel 50 was constructed of 10 inch diameter stainless steel pipe approximately 3.95 meters in diameter and had a total volume of 715 liters. The pump stations 60 each had nominal pumping speed of 33 liter per second nitrogen and 36 liters per second helium.

Figure 2A:
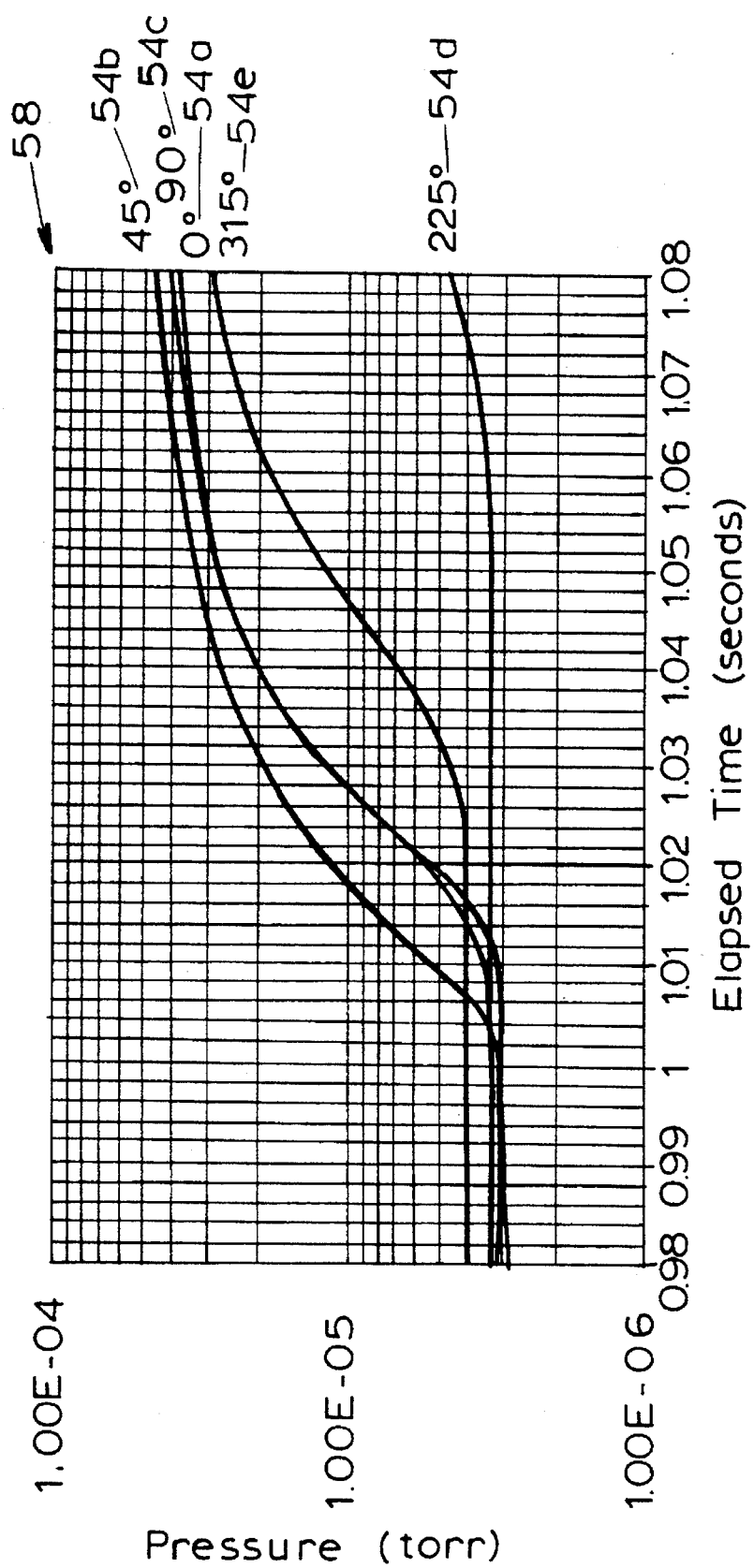
FIGS. 2A through 2G are representative outputs of data from the apparatus of FIGS. 1 and 2 based on simulated leaks into the apparatus.
Figure 2B:
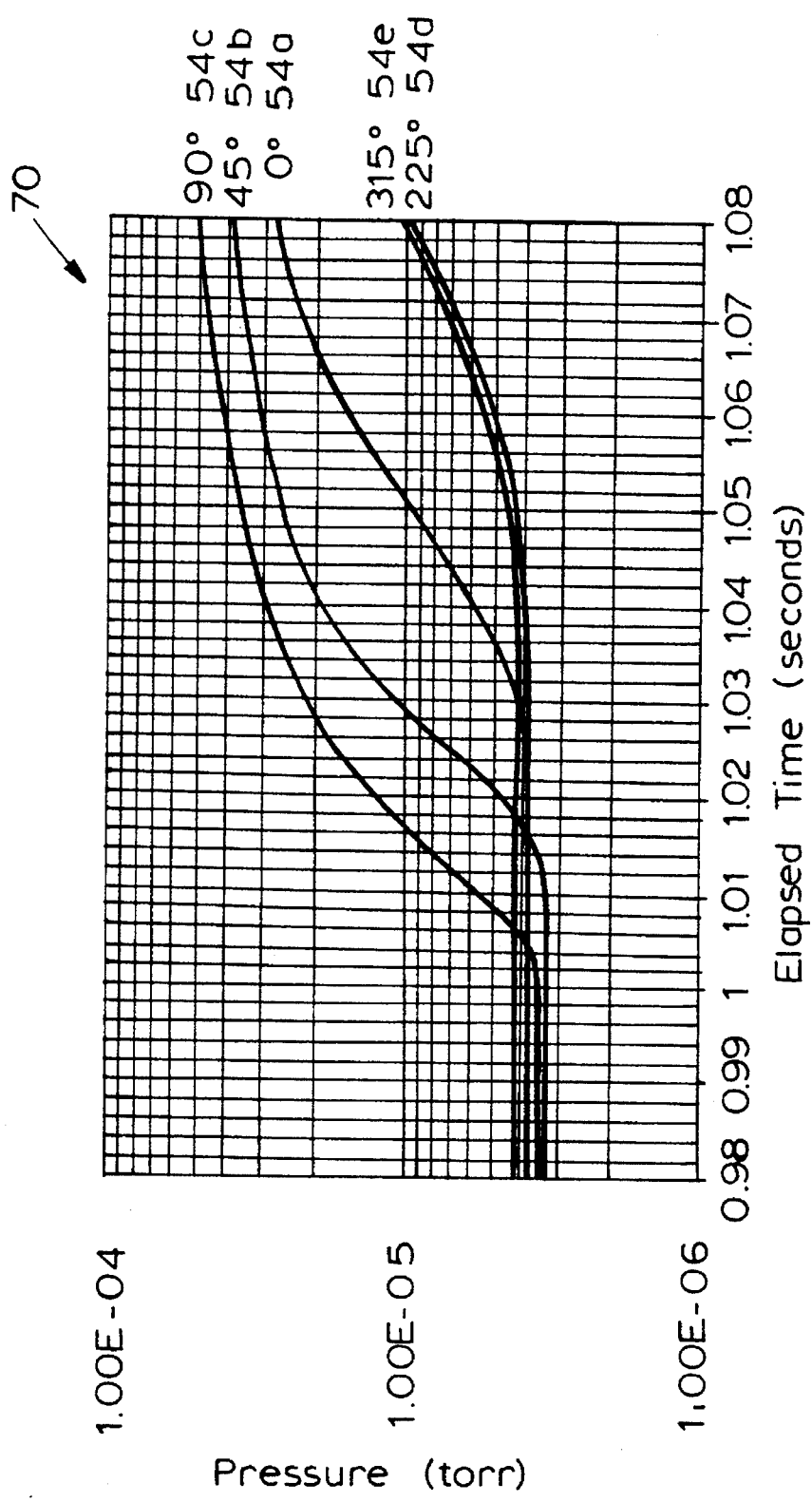

FIGS. 2A and 2B illustrate output when the vessel 50 is exposed to a $1.0\times10^{-2}$ std. cc/sec. air leak. FIG. 2A illustrates output 58 which results from a leak 62 occurring at the 45° azimuth position adjacent to pressure gauge 54b. Clearly, pressure gauge 54b reacted first and at the highest (steepest) rate of pressure rise. Pressure gauges 54a and 54c at 0° and 90° respectively responded nearly in unison and with substantially the same rate of rise. Pressure gauge 54e is the next closest gauge to the leak 62 and pressure gauge 54d which is at the opposite side of vessel 50 reacts very little to the leak 62 and remains nearly flat. Pressure gauge 54f was not monitored. Thus, with nothing more than output 58 an operator could identify the source of leak 62 as being adjacent to pressure gauge 54b and nearly equidistant from pressure gauges 54a and 54c.

FIG. 2B illustrates output 70 when leak 72 occurs at the 90° azimuth location. Gauge 54c responds first and with the highest recorded-rate or pressure rise. Gauges 54b and 54a then respond in order as being further from the source of the leak. Gauge 54e responds slightly ahead of and with a greater rate of pressure rise than gauge 54d because of their relative distance from leak 72. Thus, an operator can identify the source of leak 72 as being nearest gauge 54c and slightly closer to gauge 54e than 54d. Gauge 54f when monitored would aid in pinpointing leak 72 at the 90° azimuth location.

Figure 2C:
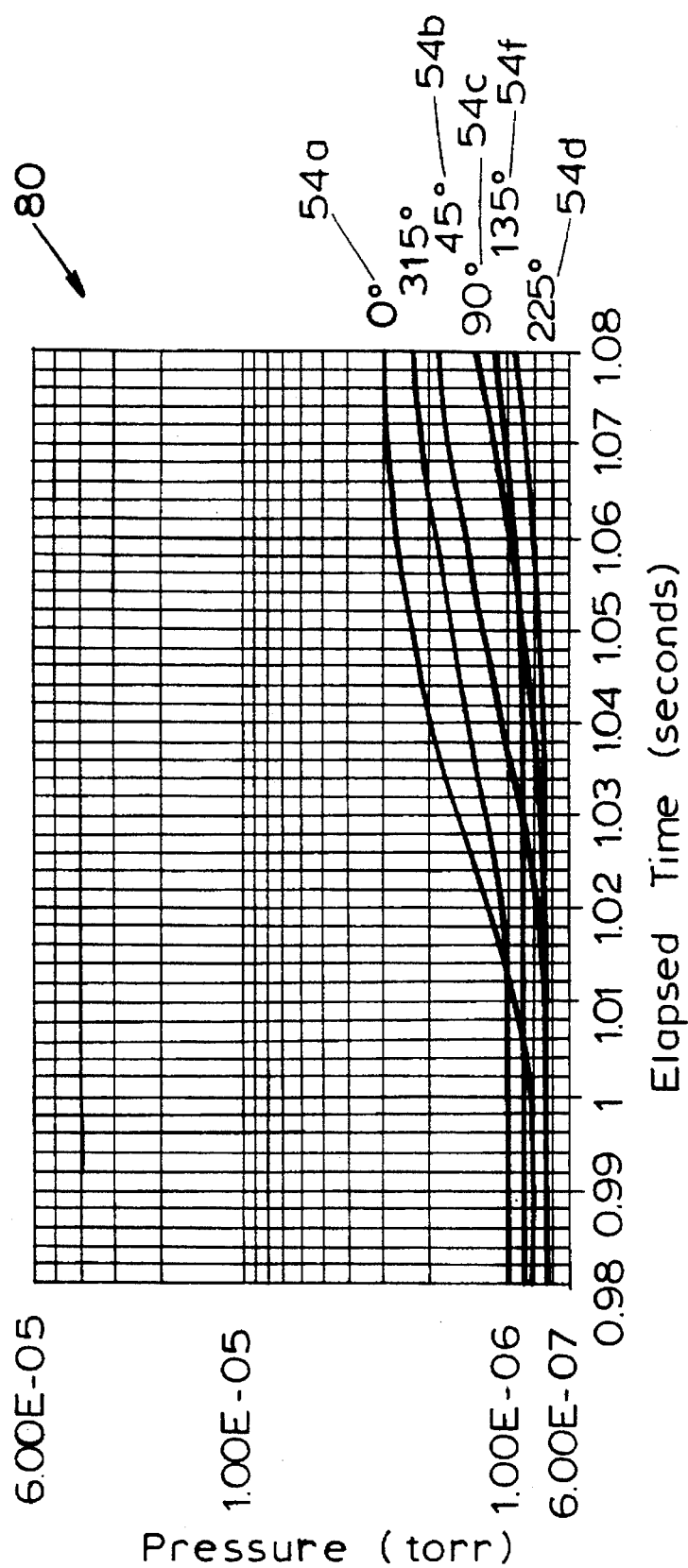

FIG. 2C illustrates output 80 for a much smaller $7.4\times10^{-6}$ std. cc/sec. helium leak 82 at 0° azimuth location into an open ring. In this configuration pressure gauge 54f at the 135° azimuth location was monitored. The location of leak 82 is readily discernable as described above, but due to its smaller size the rate of pressure rise is considerably smaller. Thus, additional information regarding relative leak size is ascertained by the invention.

Figure 2D:
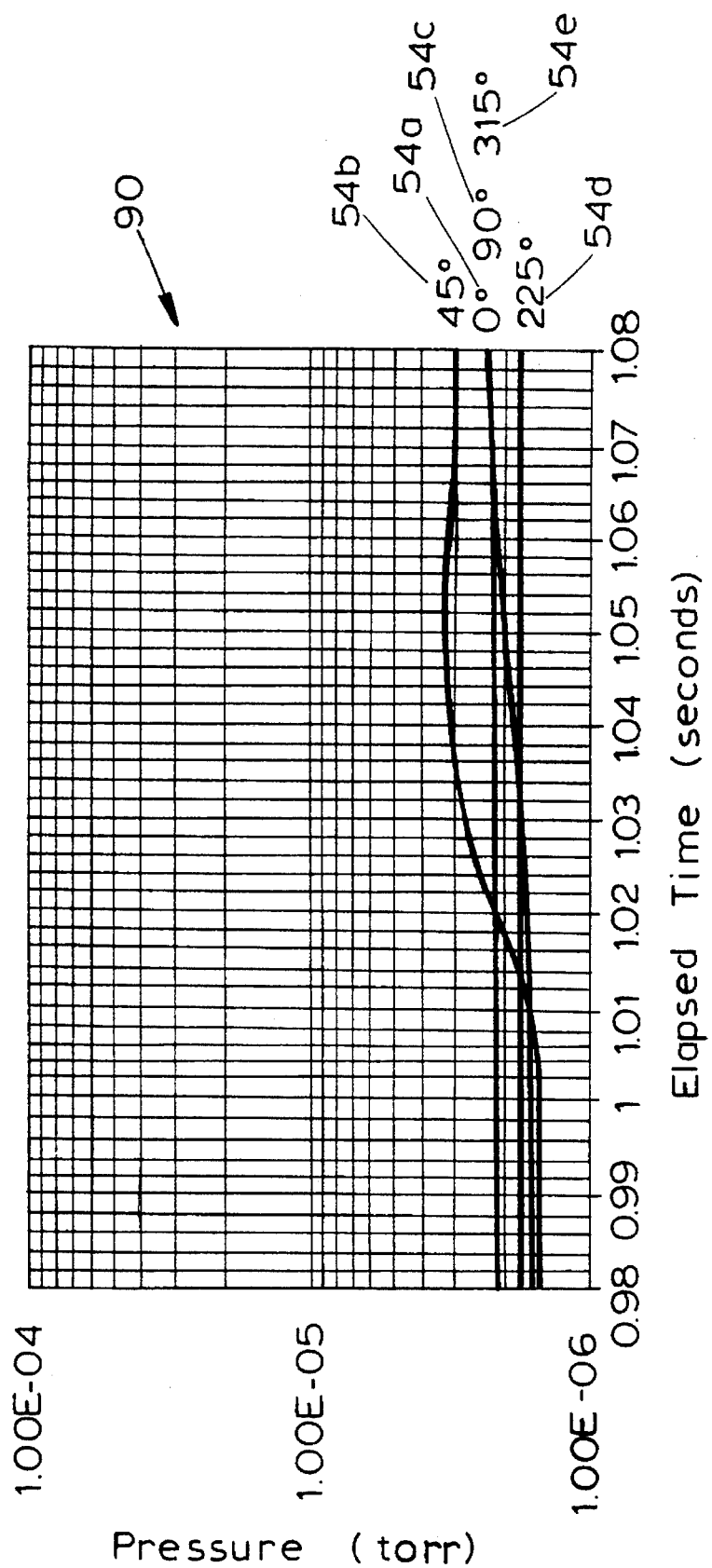

Output 90, for a still smaller $1.0\times10^{-6}$ std. cc/sec. air leak is illustrated in FIG. 2D, which is located at the 45° azimuth location. Pressure gauge 54b is the first to register a rise in pressure with a relatively sharp increase in the rate of pressure rise. Gauges 54a and 54c registered a slight increase in pressure with a very gradual rate of pressure rise.

In the test ring vessel 50 configuration a $1.5\times10^{-8}$ std. cc/sec. helium leak is too small to generate signal information. The minimum increment of pressure change signal that must be generated for analysis in the open ring depicted in FIG. 2 and the instrumentation described above is a $1.0\times10^{-6}$ std. cc/sec. air leak and a $7.4\times10^{-6}$ std. cc/sec. helium leak.

Figure 2E:
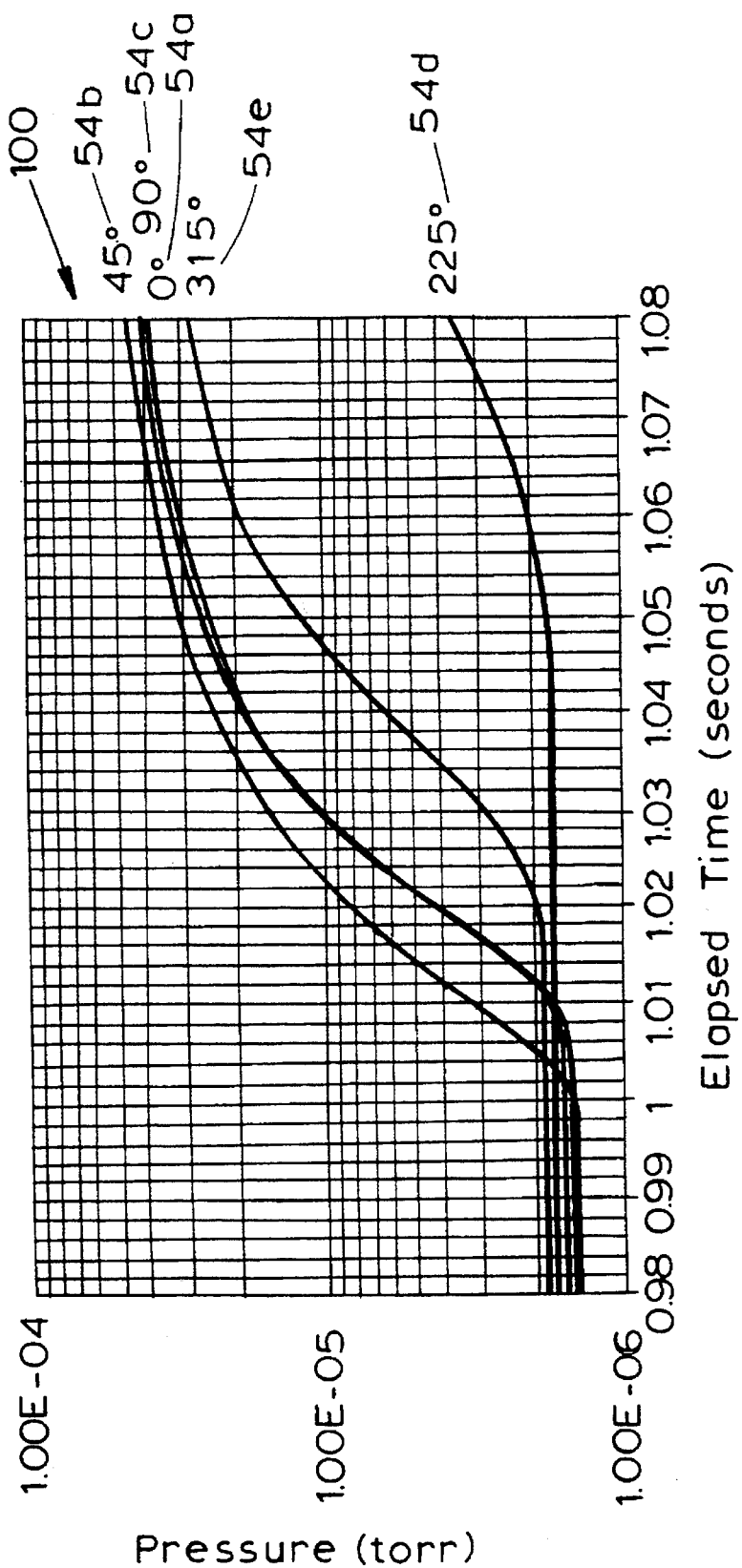

The output 100 for a relatively large leak, $5.0\times10^{-2}$ std. cc/sec. located at the 45° azimuth position, is depicted in FIG. 2E. The dramatic rates of pressure rise at the various gauge locations is readily apparent and indicates to the operator the relative size, as well as, the location of the leak.

Figure 2F:
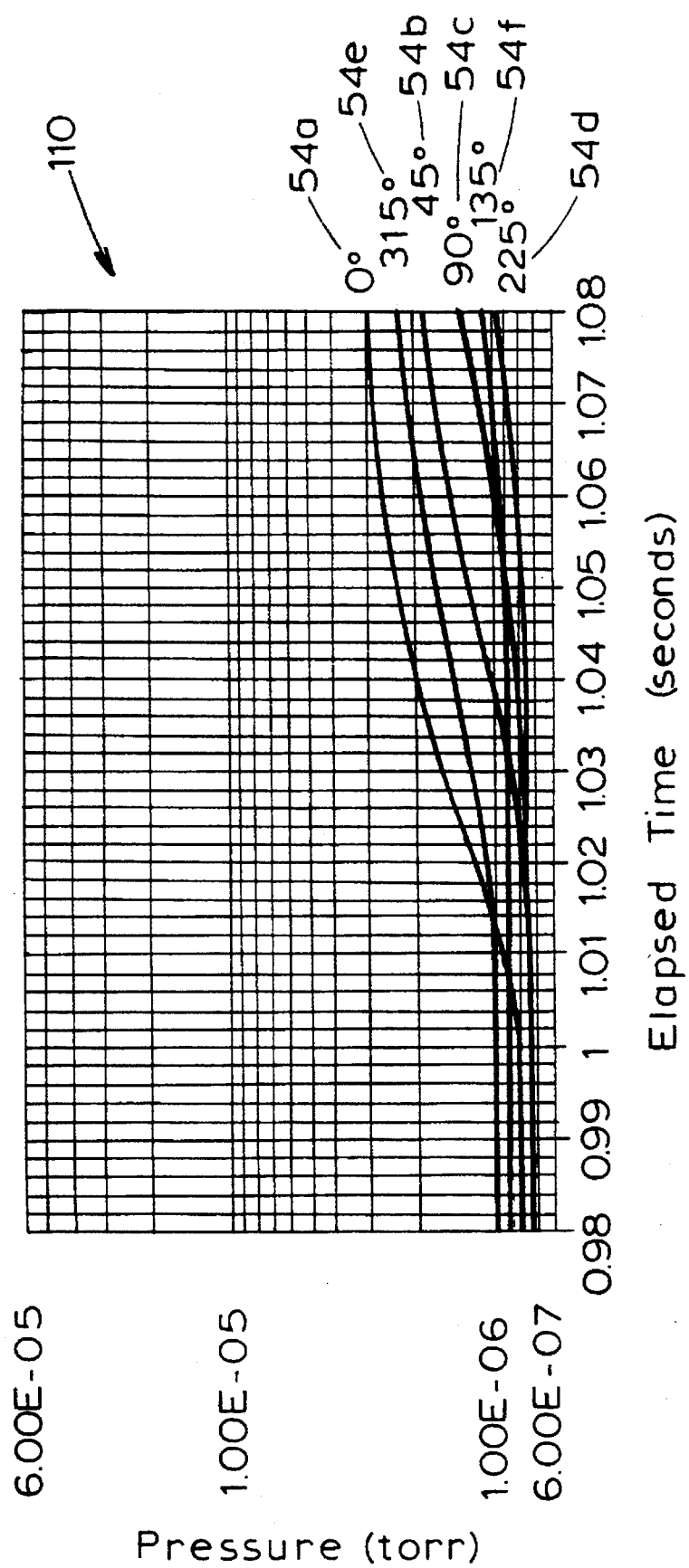
Figure 2G:
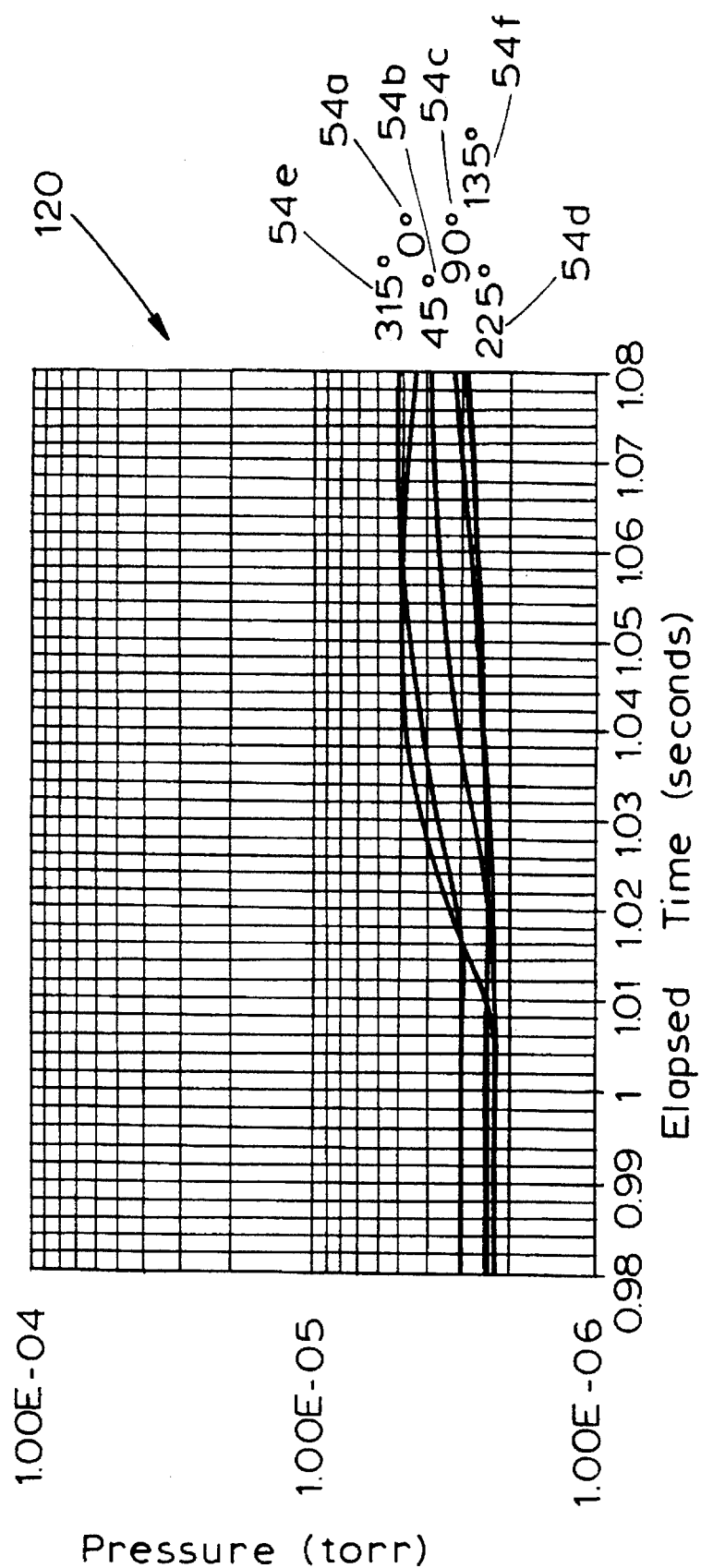

FIGS. 2F and 2G illustrate outputs 110 and 120, respectively. Each output reflects the apparatus described above with a $7.4\times10^{-6}$ std. cc/sec. helium leak at 0° azimuth location. Output 110 reflects the turbomolecular pumping stations 60 pumping on the system while output 120 was obtained with the turbomolecular pumps 60 isolated from the system. The signal discrimination can be resolved in both conditions although the discrimination is better with the pumps on.

Figure 3:
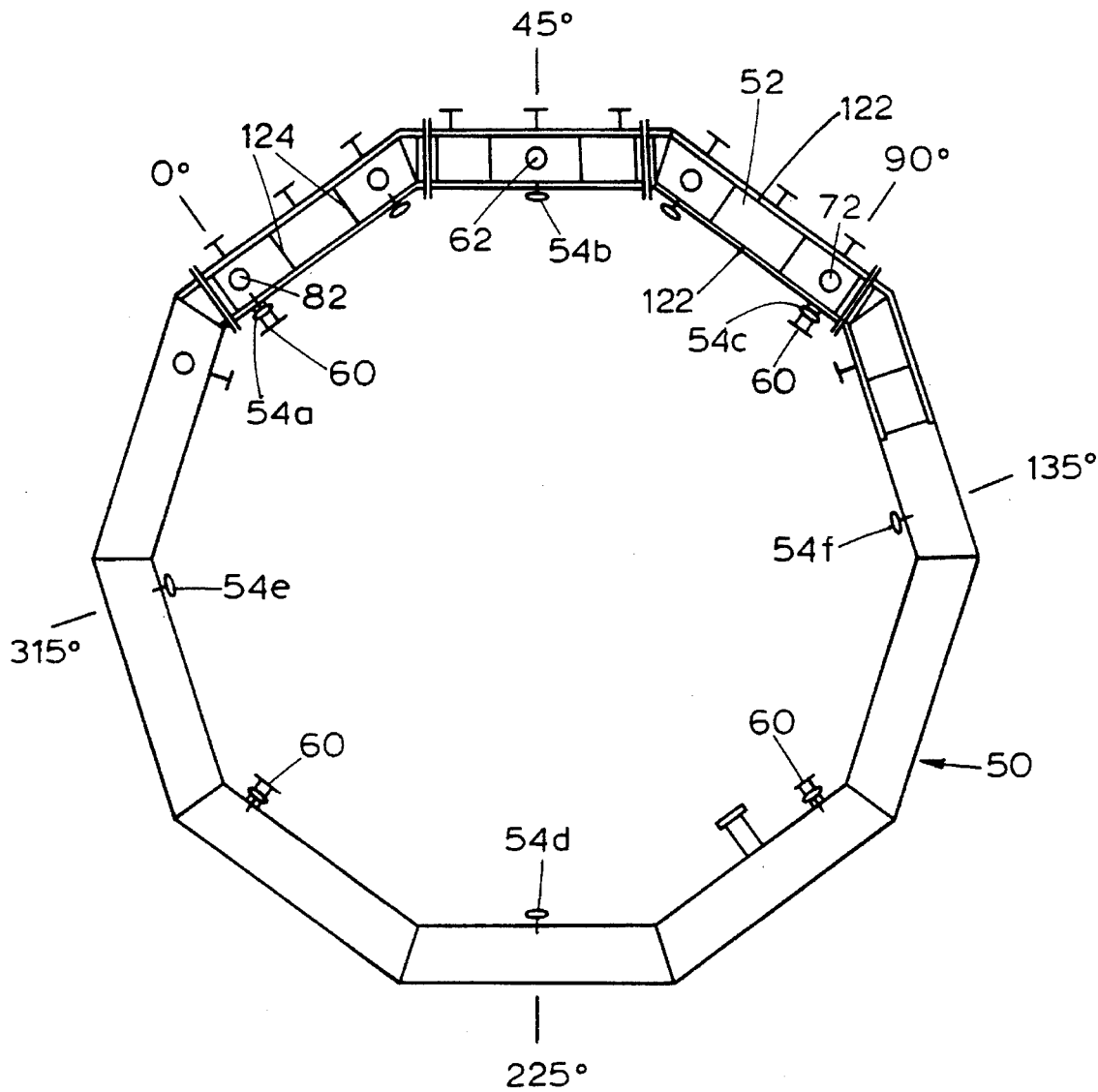
FIG. 3 is a plan view of another vacuum vessel to which the invention has been applied.

FIG. 3 illustrates a test ring 50 that is identical to the test ring 50 in FIG. 2 except that rather than being "open," a multiple layer insulating (MLI) blanket 122 made partly of aluminized mylar is used to line the sections of the ring 50 between the 0° and 120° azimuth location, as illustrated. The MLI blanket 122 is held in place by retaining bands 124 and reduces the conductance of test ring 50 where it is installed.

Figure 3A:
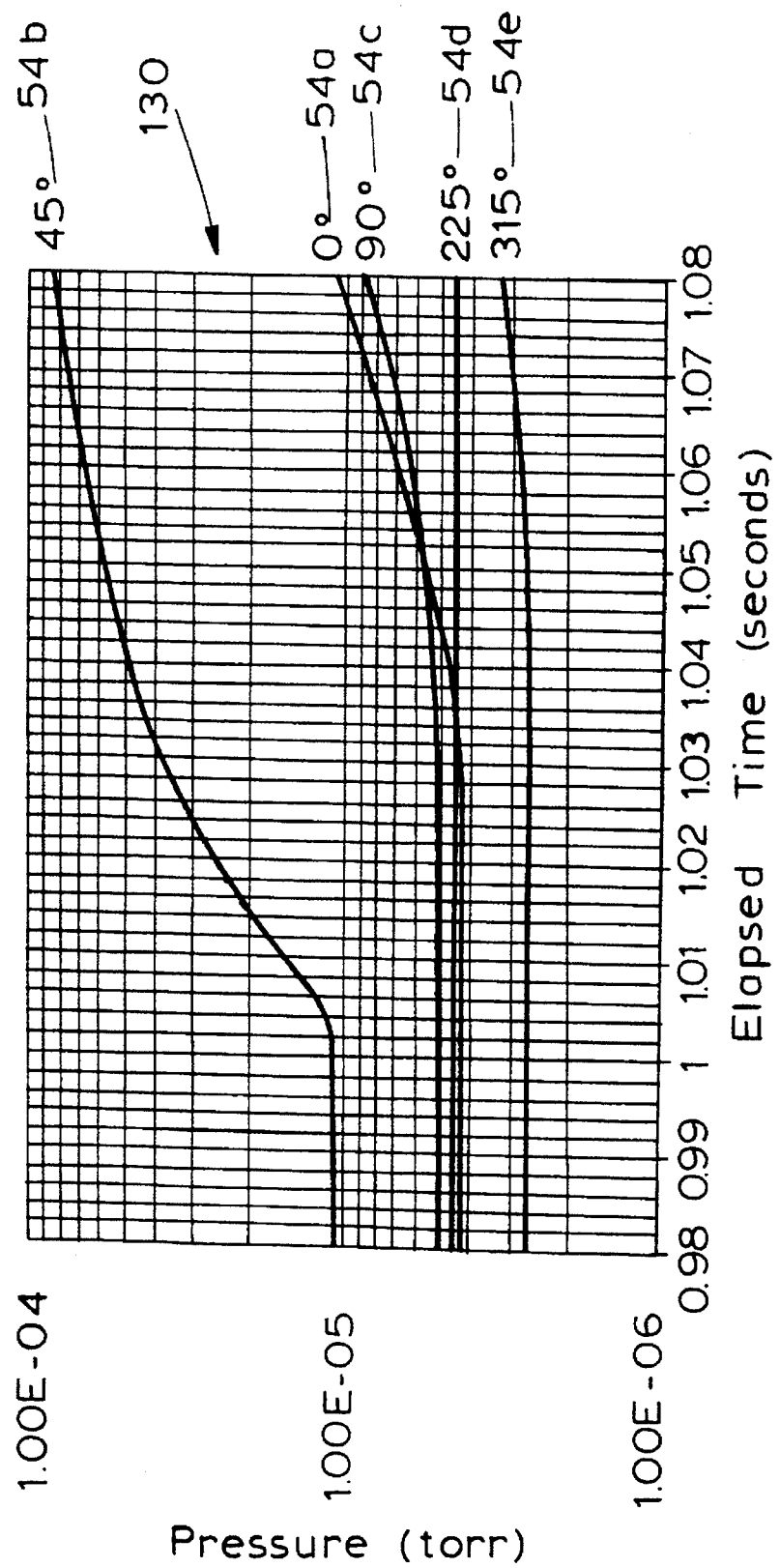
FIG. 3A is a representative output of data from the apparatus of FIG. 3 based on a simulated leak into the apparatus.

FIG. 3A illustrates output 130 from leak 62 of $1.0\times10$ std. cc/sec. into the partially lined test ring of FIG. 3 at the 45° azimuth location. As is readily seen, the signal discrimination improves dramatically when the conductance of the test ring is reduced which makes locating the leak much easier.

Figure 4:
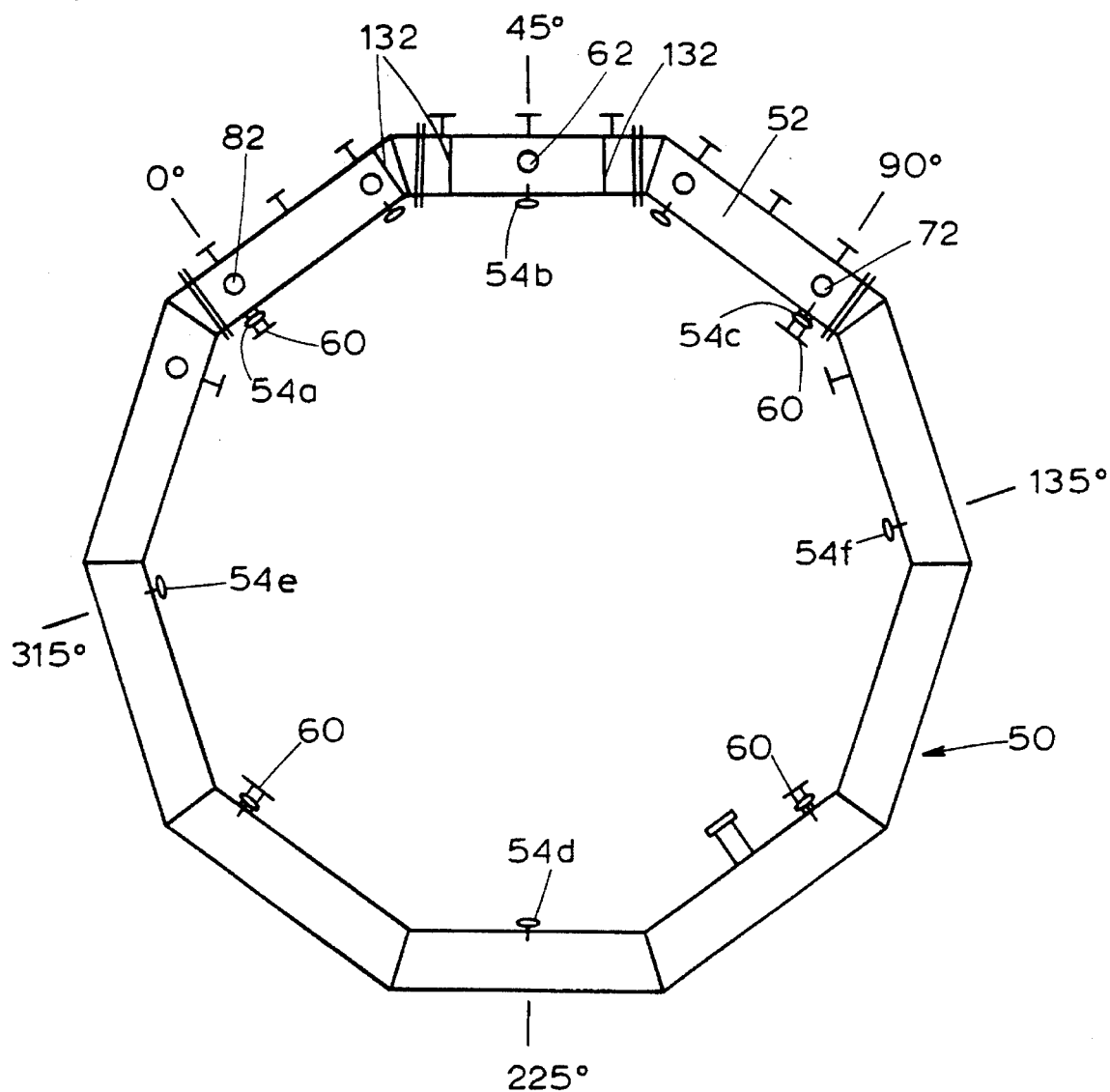
FIG. 4 is a plan view of another vacuum vessel to which the invention has been applied.
Figure 4A:
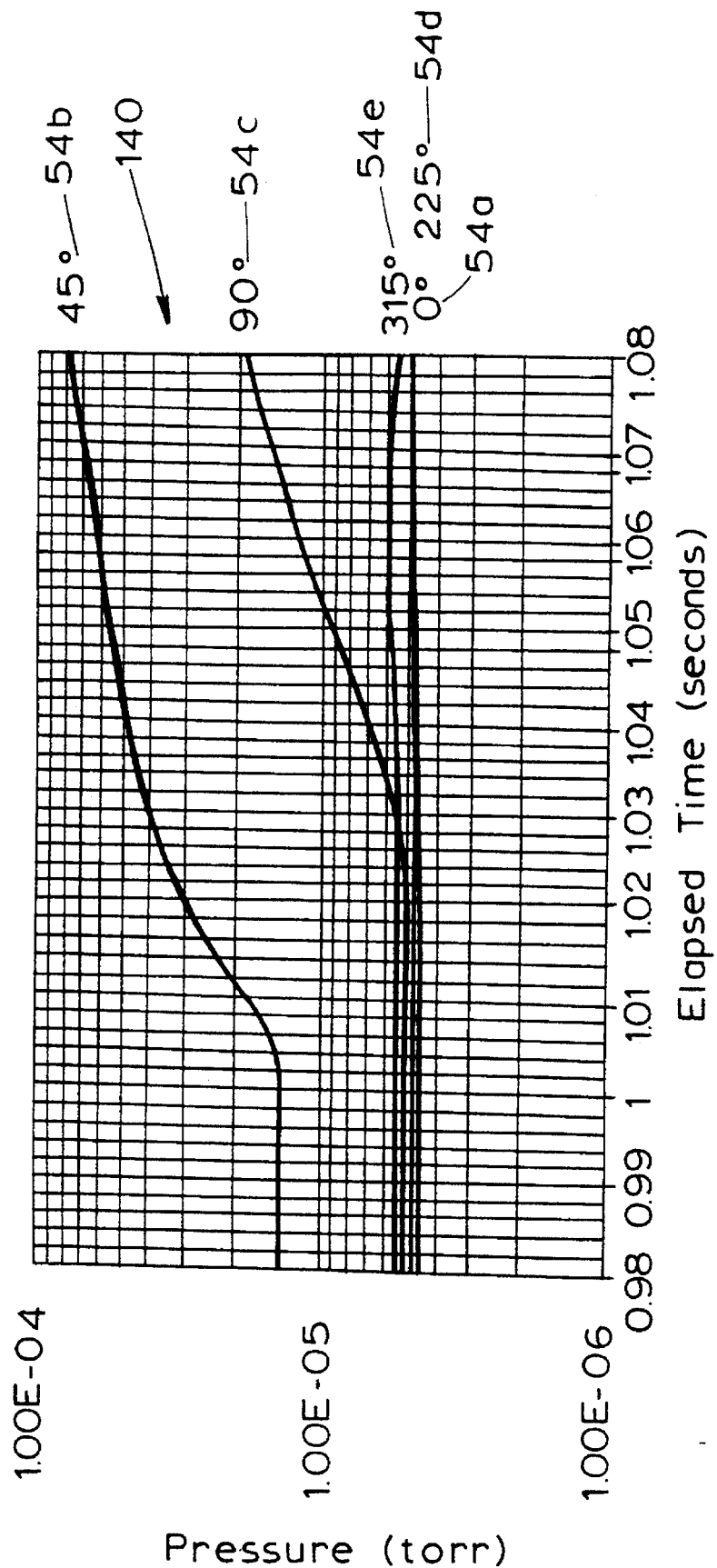
FIG. 4A is a representative output of data from the apparatus of FIG. 4 based on a simulated leak into the apparatus.

FIG. 4 illustrates an unlined test ring 50 with MLI curtains 132 obstructing but not sealing the cross-section of test ring 50. Two MLI curtains were installed between 0° and 45°, and one was installed between the 45° and 90° azimuth locations. FIG. 4A illustrates output 140 from the apparatus for an air leak 62 of $1.0\times10^{-2}$ located at 45° azimuth. Again, the reduced conductance of test ring 50 resulted in greater discrimination of gauge output and, thus, more precise determination of leak location.

Insulating vacuum vessels frequently include multiple layer insulation (MLI) blankets that are spaced apart from the vessel because they are wrapped around cooling shrouds for example. The space between the blanket and the vessel can be monitored as described above.

Figure 5:
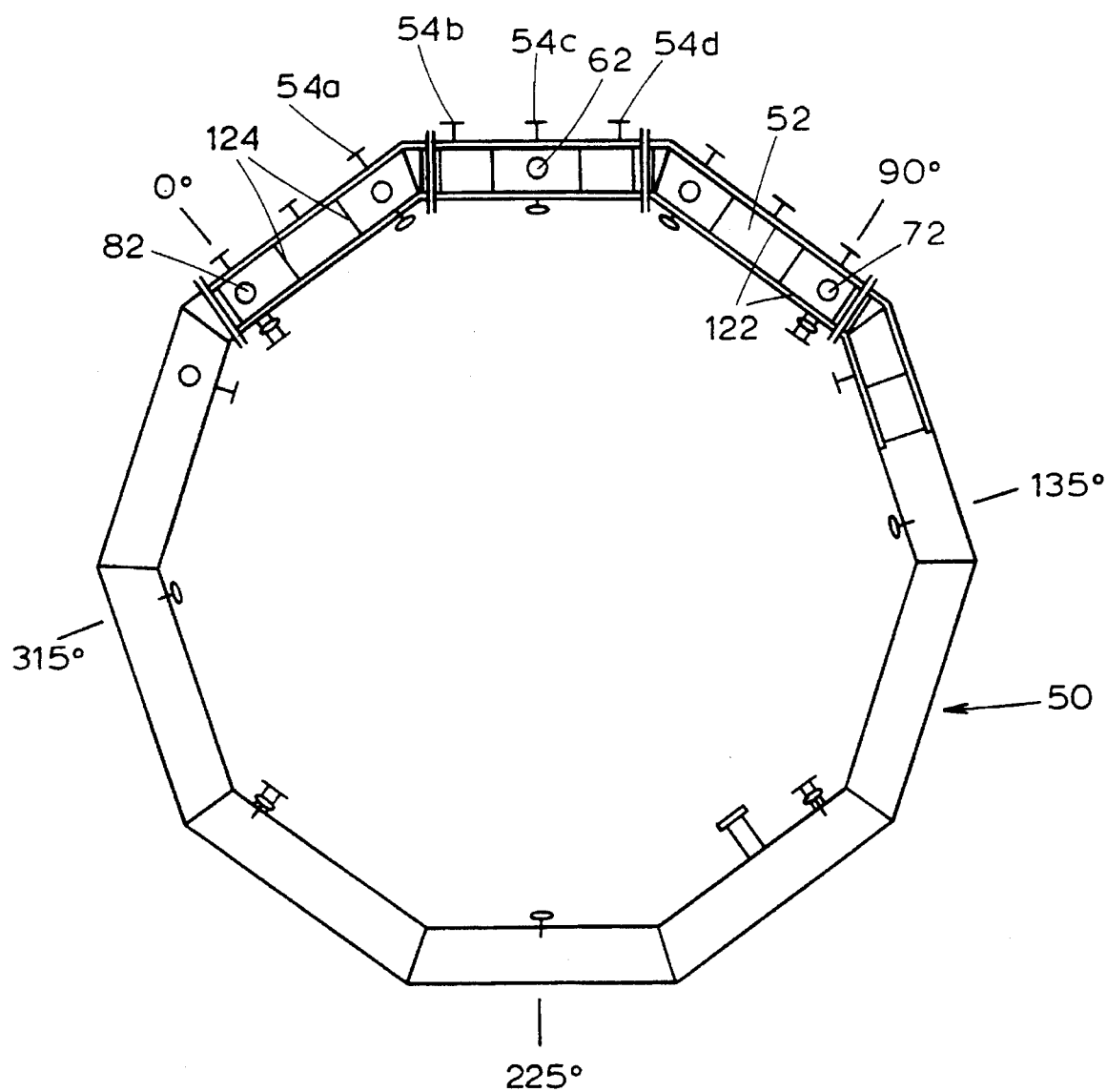
FIG. 5 is a plan view of another vacuum vessel to which the invention has been applied.

FIG. 5 illustrates a test ring 50 that is similar to the test ring 50 in the previous figures except that gauges 54 are located at 22°, 33°, 45° and 56° azimuth locations (17 inch spacings) demonstrate the ability to distinguish leak locations down to a very small distance. The test ring 50 in FIG. 5 is partially lined with MLI blanket 122 from 0° to 120° as in FIG. 3 to reduce conductance.

Figure 5A:
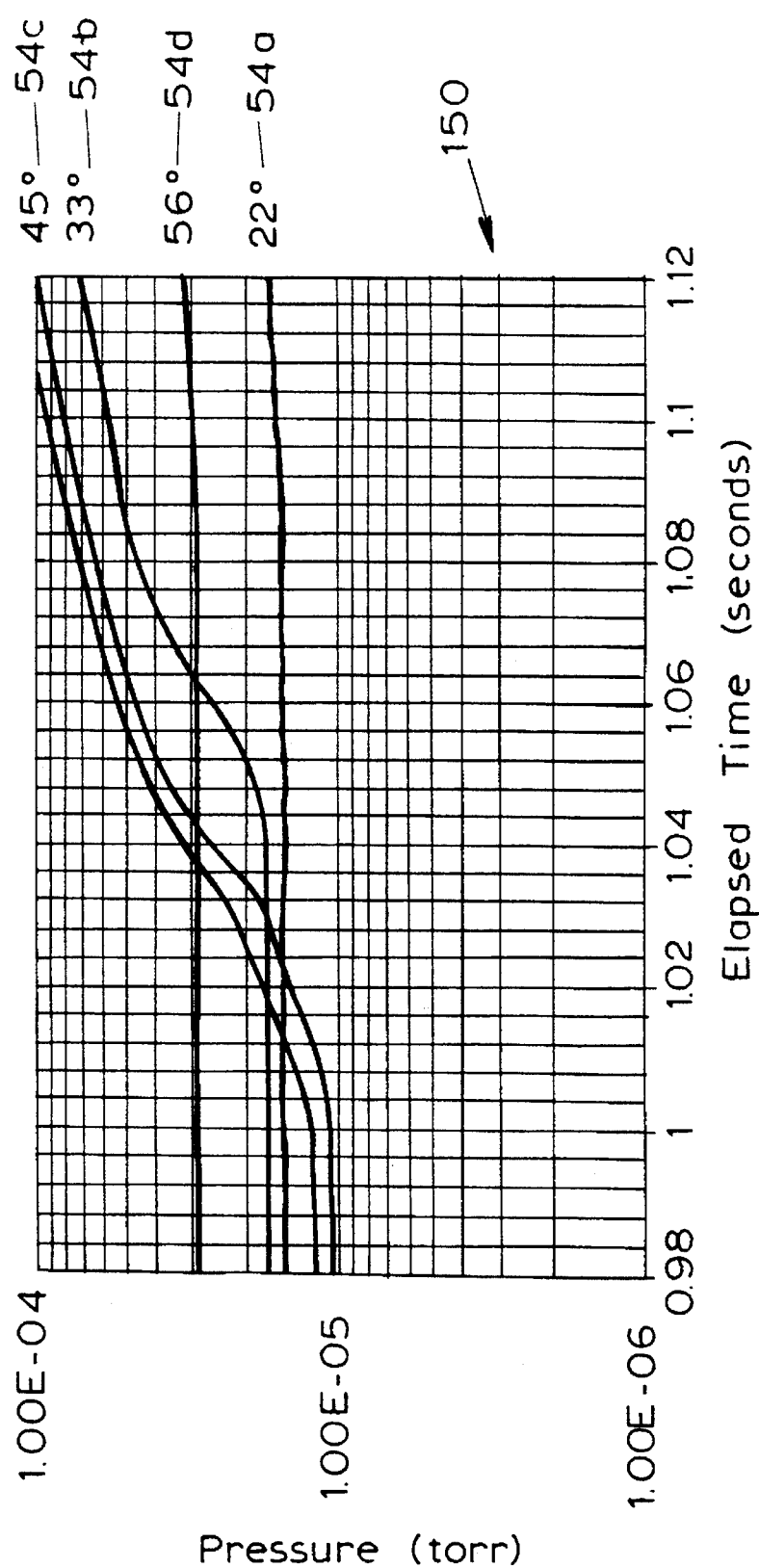
FIGS. 5A and 5B are representative outputs of data from the apparatus of FIG. 5 based on simulated leaks into the apparatus.
Figure 5B:
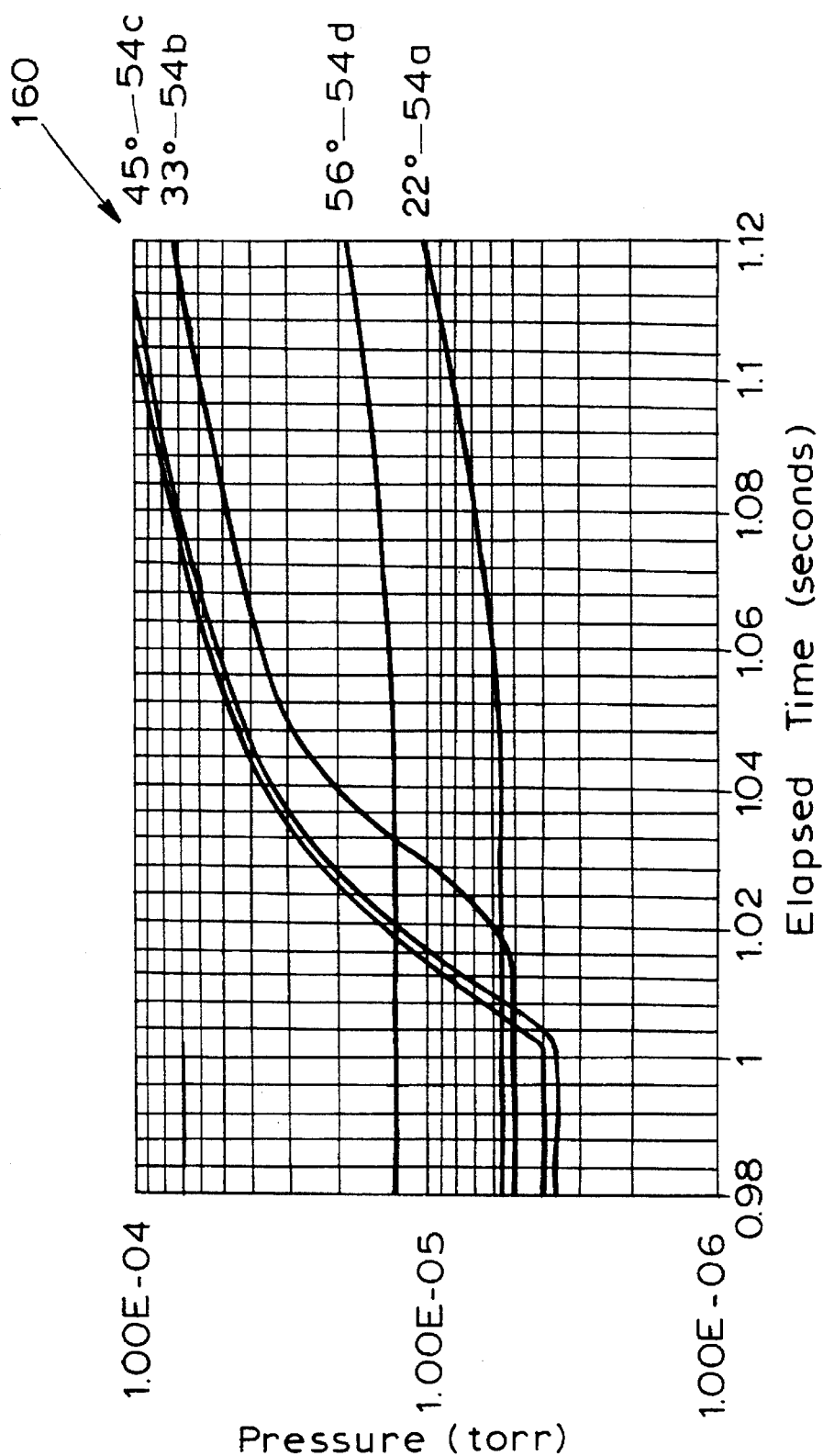

FIG. 5A and 5B illustrate outputs 150 and 160, respectively. In FIG. 5A the output 150 resulted from a relatively small air leak 62 of $1.0\times10^{-6}$ std. cc/sec. at 45° azimuth. The output 160 in FIG. 5B resulted from a relatively small helium leak 62 of $7.0\times10^{-3}$ std. cc/sec. at the same location. A leak location analysis was possible for both of these small leaks.

In vessels or applications of larger volumes than those described, boundaries may be constructed to define manageable volumes of restricted conductance. The number of such volumes would increase for very large vacuum systems, as would the number of gauges and the size of the data acquisition and processing requirement. Nevertheless, these increases do not affect the underlying principles and methods described herein.

Figure 6:
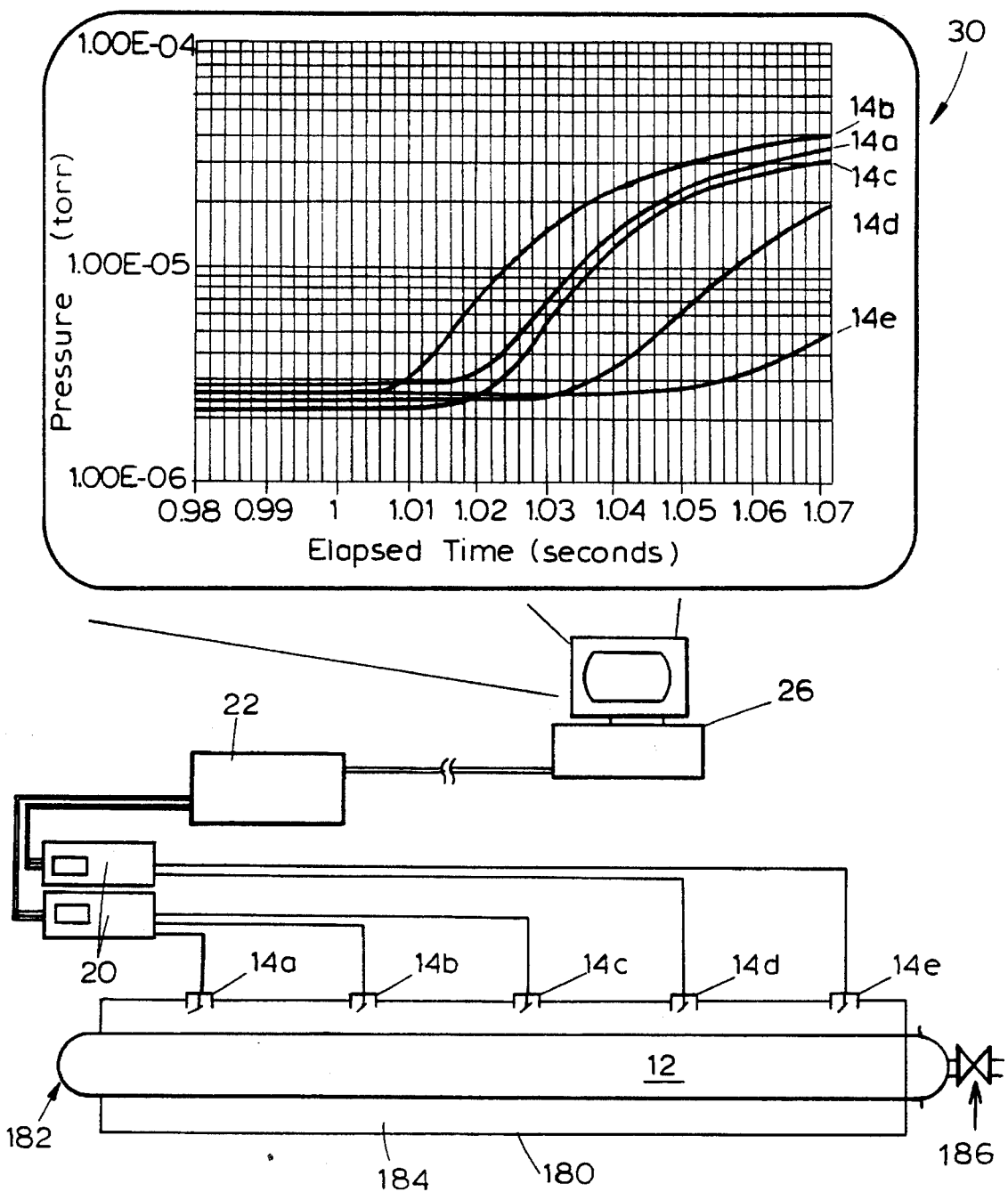
FIG. 6 is a schematic drawing of an alternate embodiment of a device useful in practicing the present invention.

FIG. 6 illustrates an apparatus with the same vacuum gauges 14, gauge controllers 20, data acquisition system 22 and computer 26 as was shown in FIG. 1. FIG. 6 includes an outer vessel 180 surrounding the inner vessel 182 to define a space 184 therebetween. Both vessels are initially evacuated to a steady state. Vacuum gauges 14 are in communication with the space 184 so that the invention is monitoring the evacuated space 184 between the two vessels. The inner vessel 182 is back filled with air or another gas through a valve 186. If there is a leak from the inner vessel 182 into the space 184 defined by the outer vessel, there will be an increase in the pressure in the evacuated space 184. This increase in pressure will be detected by the invention and will result in the display 30 much the same as in FIG. 1. From this display, it is possible to locate the area of the boundary wall which contains the leak. The vessels depicted herein are merely representative of any vessel within a vessel system having an evacuated space. Evacuated spaces can be any suitable shape and be defined by any appropriate materials such as aluminum, steel or stainless steel.

It is claimed:

1. Apparatus comprising:

an evacuated space defined at least partially by a boundary layer;

a plurality of spaced-apart pressure gauges in communication with the evacuated space at known locations within the evacuated space;

each pressure gauge has means for detecting pressure rise and rate of pressure rise within the evacuated space adjacent the pressure gauge, and means for generating a signal corresponding to the detection of pressure rise and rate of pressure rise;

and means for receiving and processing the signals generated by the pressure gauges to identify the particular pressure gauge that first detects a pressure rise and the same particular pressure gauge that detects the highest rate of pressure rise as means for determining the location of the source of a leak into the evacuated space as being nearest to that gauge.

2. The apparatus of claim 1 in which the pressure gauges are cold cathode ionization gauges.

3. The apparatus of claim 1 in which the pressure gauges are hot cathode ionization gauges.

4. The apparatus of claim 1 in which the boundary layer is defined by a vessel which includes:

an inner container containing cold fluid; and an outer container surrounding the inner container to define an evacuated space therebetween.

5. The apparatus of claim 1 in which the boundary layer is defined by a vessel which includes:

an inner container defining the evacuated space; and an outer container surrounding the inner container to define a space therebetween containing helium.

6. The apparatus of claim 1 and further comprising:

means for reducing the gaseous conductance in the evacuated space.

7. The apparatus of claim 1 in which the evacuated space is at least partially defined by means for reducing gaseous conductance in the evacuated space.

8. The apparatus of claim 1 in which the evacuated space is at least partially lined by an aluminized mylar multiple layer insulation.

9. The apparatus of claim 1 in which at least one of the pressure gauges is in communication with the evacuated space through a gaseous conductance tube attached to the inlet of the pressure gauge through which the pressure gauge can monitor the pressure in a location in the evacuated space that is remote from the location of the pressure gauge.

10. A method for detecting leaks across a boundary between discrete volumes at least one of which is an evacuated space, the method comprising:

detecting pressure rise and rate of pressure rise at a plurality of locations via a plurality of pressure gauges in communication with known locations within the evacuated space;

generating a signal from a plurality of pressure gauges corresponding to the detection of a pressure rise and rate of pressure rise at each location; and receiving the signals into a data acquisition system to identify the time of arrival of the increase in pressure at each location, the rate of pressure rise at each location, and direction of pressure propagation to locate the source and location of a leak into the evacuated space.

11. Apparatus for detecting leaks across a boundary layer which at least partially defines an evacuated space, comprising:

a plurality of spaced-apart pressure gauges in communication with the evacuated space at known locations within the evacuated space;

each pressure gauge has means for detecting pressure rise and rate of pressure rise within the evacuated space adjacent the pressure gauge, and means for generating a signal corresponding to the detection of pressure rise and rate of pressure rise; and means for receiving and processing the signals generated by the particular pressure gauge that first detects a pressure rise and the same particular pressure gauge that detects the highest rate of pressure rise as means for determining the location of the source of a leak into the evacuated space as being nearest to that gauge.

12. The apparatus of claim 11 in which the pressure gauges are cold cathode ionization gauges.

13. The apparatus of claim 11 in which the pressure gauges are hot cathode ionization gauges.

14. The apparatus of claim 11 and further comprising:

means for reducing the gaseous conductance in the evacuated space.

15. The apparatus of claim 11 in which at least one of the pressure gauges is in communication with the evacuated space through a gaseous conductance tube attached to the inlet of the pressure gauge through which the pressure gauge can monitor the pressure in a location in the evacuated space that is remote from the location of the pressure gauge.

* * * * *